United States Patent
Ewert

(10) Patent No.: US 12,128,890 B2
(45) Date of Patent: Oct. 29, 2024

(54) METHOD FOR OPERATING AN AUTONOMOUS DRIVING FUNCTION OF A VEHICLE

(71) Applicant: Robert Bosch GmbH, Stuttgart (DE)

(72) Inventor: Marlon Ramon Ewert, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 182 days.

(21) Appl. No.: 17/642,367

(22) PCT Filed: Nov. 3, 2020

(86) PCT No.: PCT/EP2020/080801
§ 371 (c)(1),
(2) Date: Mar. 11, 2022

(87) PCT Pub. No.: WO2021/094136
PCT Pub. Date: May 20, 2021

(65) Prior Publication Data
US 2022/0324440 A1    Oct. 13, 2022

(30) Foreign Application Priority Data
Nov. 11, 2019 (DE) ............ 10 2019 217 393.4

(51) Int. Cl.
*B60W 30/095* (2012.01)
*B60W 50/06* (2006.01)
*B60W 60/00* (2020.01)

(52) U.S. Cl.
CPC ........ *B60W 30/0956* (2013.01); *B60W 50/06* (2013.01); *B60W 60/0015* (2020.02); *B60W 2554/802* (2020.02); *B60W 2555/20* (2020.02)

(58) Field of Classification Search
CPC ............ B60W 30/0956; B60W 50/06; B60W 60/0015; B60W 2554/802; B60W 2555/20; B60W 50/04; B60W 60/00186
See application file for complete search history.

(56) References Cited

U.S. PATENT DOCUMENTS

2008/0065328 A1* 3/2008 Eidehall ............ G01S 7/295
                                                         701/301
2017/0031369 A1* 2/2017 Liu ............ G08G 5/0069
(Continued)

FOREIGN PATENT DOCUMENTS

DE   102012108543 A1   3/2014
DE   102013219567 A1   4/2015
(Continued)

OTHER PUBLICATIONS

International Search Report for PCT/EP2020/080801, Issued Feb. 25, 2021.

*Primary Examiner* — Peter D Nolan
*Assistant Examiner* — Anwar Mohamed
(74) *Attorney, Agent, or Firm* — NORTON ROSE FULBRIGHT US LLP; Gerard A. Messina

(57) ABSTRACT

A method for operating an autonomous driving function of a vehicle. The vehicle includes a computer unit and sensors for detecting surroundings data. The computer unit is configured to determine a setpoint trajectory for the vehicle, based on the detected surroundings data. In step a), an actual trajectory, and distances from objects in the surroundings, are detected. In step b), an ascertainment of the quality of the autonomous driving function takes place by comparing the actual trajectory to the setpoint trajectory and monitoring the detected distances from objects in the surroundings. In step c), a control of the quality to a predefined target value takes place by selecting sensors to be used for the autonomous driving function from the plurality of sensors and/or by (Continued)

changing a measuring rate, at which measurements are carried out, of at least one sensor from the plurality of sensors.

17 Claims, 1 Drawing Sheet

(56) References Cited

U.S. PATENT DOCUMENTS

| | | | |
|---|---|---|---|
| 2017/0075355 A1 | 3/2017 | Micks et al. | |
| 2018/0032083 A1* | 2/2018 | Oska | B60W 10/04 |
| 2018/0143625 A1* | 5/2018 | Nelson | E02F 9/26 |
| 2018/0272963 A1* | 9/2018 | Meyhofer | G01S 17/931 |
| 2018/0348767 A1* | 12/2018 | Jafari Tafti | G08G 1/163 |
| 2019/0047555 A1* | 2/2019 | Düring | B60W 30/09 |
| 2019/0389459 A1* | 12/2019 | Berntorp | B60W 30/18163 |
| 2020/0039528 A1 | 2/2020 | Ewert | |
| 2020/0193686 A1* | 6/2020 | Chong | G06T 15/06 |
| 2020/0356091 A1* | 11/2020 | Nagarajan | G05D 1/0088 |
| 2020/0361457 A1* | 11/2020 | Sharda | G05D 1/0088 |
| 2023/0417565 A1* | 12/2023 | Saxena | B60W 30/18163 |

FOREIGN PATENT DOCUMENTS

| | | |
|---|---|---|
| DE | 102014207694 A1 | 10/2015 |
| DE | 102017114049 A1 | 1/2018 |
| DE | 102017205495 A1 | 10/2018 |
| DE | 102017219114 A1 | 4/2019 |

* cited by examiner

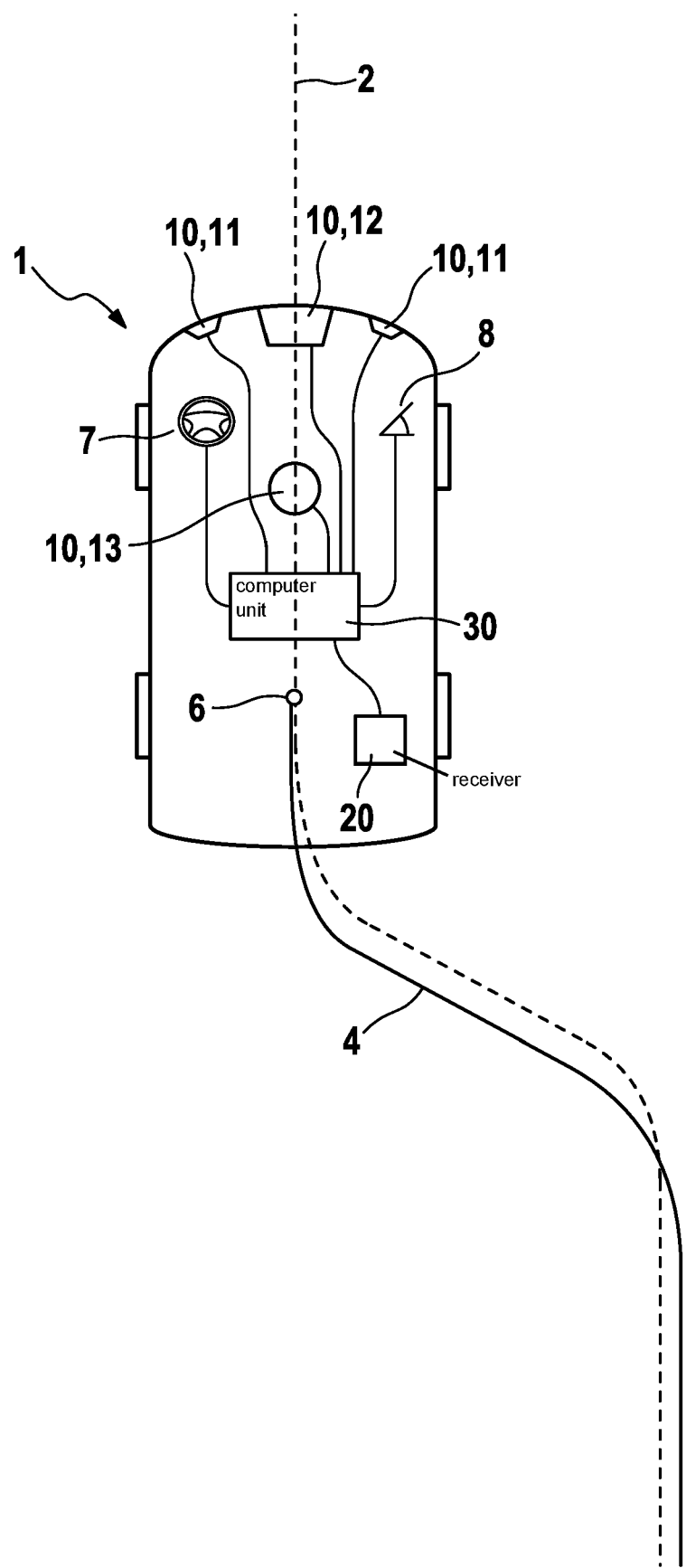

METHOD FOR OPERATING AN AUTONOMOUS DRIVING FUNCTION OF A VEHICLE

FIELD

The present invention relates to a method for operating an autonomous driving function of a vehicle, the vehicle including a computer unit and at least two sensors for detecting surroundings data, and the computer unit being configured to determine a setpoint trajectory, along which the vehicle is guided, based on the detected surroundings data. Further aspects of the present invention relate to a computer program and to a vehicle, which are configured to carry out the method.

BACKGROUND INFORMATION

Some vehicles in the related art have an autonomous driving function, with the aid of which the vehicle may be guided along a trajectory from a starting position to a target position, without the intervention of a driver. In the process, the trajectory depicts a path along which the vehicle is moved. Such autonomous driving functions may relieve a driver of a vehicle in that the vehicle is autonomously moved in certain situations or during the entire driving operation.

Precise surroundings data which describe the surroundings of the vehicle are necessary for providing such autonomous driving functions. A plurality of sensors is used for detecting these surroundings data. It is problematic in this regard that considerable computing resources are necessary for processing the surroundings data.

German Patent Application No. DE 10 2012 108 543 A1 describes a method for adapting the surroundings detection of a vehicle based on pieces of information of a digital map or a piece of traffic information. A piece of traffic information may be a notification about a construction site. In the method, it is derived from the digital map, for example, whether the vehicle is situated in urban settings or on an expressway. Furthermore, information about the topology of the vehicle surroundings may be derived from the map. As a function of these pieces of information, sensor systems of the vehicle are then activated for detecting the surroundings. In the process, sensors may be activated or deactivated, and the range, resolution, sampling rate and/or the detection range may be set. As a result of the targeted adaptation of the surroundings detection to the surroundings conditions, computing time may be saved, and the precision and/or performance of the surroundings detection may be increased.

German Patent Application No. DE 10 2017 114 049 A1 describes a system for determining and adapting a route for an autonomous vehicle. The vehicle includes a sensor subsystem including various sensor systems, such as a camera or a radar. The system furthermore includes submodules, which fulfill different subtasks. The system includes a vehicle perception submodule, which executes the system functions for the perception. The modules of the system decide which sensors are to be used, how the sensors are to be used, and how the sensor data are processed.

German Patent Application No. DE 10 2013 219 567 A1 describes a method for controlling a micromirror scanner. It is provided in the method to control the micromirror scanner as a function of signals of further sensors. For example, when a particularly interesting object is established, it is finely scanned. The micromirror scanner is also controlled as a function of the weather situation, wherein parameters of the scanner during fog are optimized, for example.

The methods from the related art for adapting the operation of the sensors for the detection of the surroundings data in each case only take certain partial aspects into consideration, so that it is not ensured that, in each situation, precisely the surroundings data are available which are required for a safe operation of an autonomous driving function.

SUMMARY

In accordance with the present invention, a method for operating an autonomous driving function of a vehicle is provided, the vehicle including a computer unit and a plurality of sensors for detecting surroundings data, and the computer unit being configured to determine a setpoint trajectory, along which the vehicle is guided, based on the detected surroundings data.

In accordance with an example embodiment of the present invention, it is furthermore provided that, in a first step a), a detection of an actual trajectory takes place, the actual trajectory depicting the path actually covered by the vehicle, and that a detection of distances from objects in the surroundings of the vehicles takes place.

In a subsequent step b), an ascertainment of a quality of the autonomous driving function takes place by comparing the actual trajectory to the setpoint trajectory and monitoring the detected distances from objects in the surroundings.

In a subsequent step c) of the method, a control of the quality to a predefined target value takes place by selecting sensors to be used for the autonomous driving function from the plurality of sensors and/or by changing a measuring rate, at which measurements are carried out, of at least one sensor from the plurality of sensors.

Steps a) through c) of the method are preferably run through repeatedly during the operation of the autonomous driving function. For example, the method may be repeated after expiration of a time period in the range of 1 ms to 10 s, preferably in the range of 10 ms to 2 s, particularly preferably in the range of 100 ms to 1 s. In particular, when the method is regularly carried out in the ms range, it is possible to respond quickly to a change in the quality so that the driving safety is ensured at all times while the autonomous driving function is being carried out.

The autonomous driving function is configured to guide the vehicle from a starting position to a target position, without the intervention of a driver. In the process, the autonomous driving function is preferably not limited to certain driving maneuvers or situations and may, in particular, also take over a planning of a route to the target position. However, the autonomous driving function may also be the guidance of the vehicle in a certain situation, such as for example the guidance within a construction site or along a previously learned trajectory. The setpoint trajectory along which the vehicle is guided during the operation of the autonomous driving function is determined by the computer unit. In the process, the computer unit requires surroundings data, which are provided by the plurality of sensors.

The sensors used may, in particular, be ultrasonic sensors, optical cameras such as video cameras and infrared cameras, radar sensors, and LIDAR sensors. The plurality of sensors preferably encompasses sensors of various types, it being possible to use multiple specimens of one type of sensor. For example, the vehicle may include multiple ultrasonic sensors, multiple video cameras, a radar sensor, and a LIDAR sensor.

For the determination of the actual trajectory, it is preferably provided to continuously determine the position of the vehicle. The position determination of the vehicle takes place, for example, using a satellite navigation system, by evaluating landmarks and/or by evaluating radio signals. Particularly preferably, multiple options for the position determination are combined with one another to enhance the accuracy.

The quality of the autonomous driving function indicates how precisely the vehicle is being guided. According to an example embodiment of the present invention, the quality of the autonomous driving function is determined by comparing the setpoint trajectory, along which the vehicle is guided, to the actual trajectory actually traveled by the vehicle. The quality is thus an indication of how accurately a certain setpoint trajectory is traveled by the vehicle, taking the presently requested surroundings data into consideration. Furthermore, the quality of the autonomous driving function is ascertained by monitoring the distances from objects in the surroundings, such as for example further road users or fixed structures such as trees, walls, and poles. If the distance from objects in the surroundings is too small, this is an indication that the quality of the autonomous driving function is presently too low. For example, a minimum distance value may be predefined for the determination as to whether a distance is too small. It may be provided to predefine different minimum distance values for different classes or types of objects. For example, a larger minimum distance value may be predefined for moving objects, such as other road users, than for static objects, such as, e.g., trees. During the monitoring of the distances, the condition that the vehicle must remain on the road or on a negotiable area at all times is preferably additionally taken into consideration. This condition must be met, even if distances from further objects are then possibly within a tolerance below the predefined minimum distances.

The target value for the quality is preferably predefined in such a way that, at this quality, it is ensured at any time that the autonomous driving function is safely carried out within the permitted tolerances. This means that, at the target value for the quality, the vehicle follows the setpoint trajectory with a predefined precision and maintains predefined minimum distances from objects in the surroundings of the vehicle. At the same time, the target value for the quality is selected to be smaller than a maximally achievable quality. In this way, it is achieved that the amount of surroundings data to be processed by the computer unit is reduced compared to the processing of all available surroundings data. In this way, the capacity utilization of the computer unit is reduced, and thus, among other things, the energy demand of the computer unit is decreased.

Conventional control methods may be resorted to for controlling the quality. For controlling the quality to a predefined target value, it would be possible, for example, to predefine a limiting value for the quality, and to reduce the number of selected sensors at a quality above this limiting value, and to increase the number of selected sensors at a quality below the limiting value and/or to reduce the measuring rate of at least one sensor at a quality above the limiting value and to increase the measuring rate at a quality below the limiting value. The provision of a hysteresis would also be possible.

Preferably, a statistical model is used when controlling the quality to the target value, it being possible for the statistical model, in addition to the quality, to take further input values into consideration during the control.

Taking at least one further parameter into consideration, preferably at least one assessment factor is determined and taken into consideration during the selection of the sensors to be used and/or during the change of the measuring rate, the at least one further parameter being selected from a capacity utilization of the computer unit, a traffic situation in which the vehicle is situated, a scenario in which the vehicle is situated and/or information about the weather at the location of the vehicle.

In the case of the computer unit, it is preferably sought to keep its capacity utilization below a predefined value, so that sufficient resources are available at any time for processing the surroundings data. For example, it may be predefined to keep the capacity utilization below 80%, if possible. An unnecessarily high loading of the computer unit results in an unnecessarily high energy consumption, among other things, and should therefore be avoided.

In the case of the traffic situation, it may be taken into consideration, for example, whether dense traffic is present, i.e., a large number of moving objects must be reliably detected and taken into consideration during the creation of the setpoint trajectory, or whether only little traffic is present, i.e., only a small number of moving objects in the surroundings must be detected. Accordingly, it may be necessary to select more sensors, and/or to operate these at a higher measuring rate, for achieving the target value for the quality in the case of a traffic situation which includes dense traffic than in the case of a low traffic volume. Furthermore, certain sensors, due to their type and/or due to their position at the vehicle, may be better suited for certain traffic situations than other sensors, which preferably is taken into consideration during the selection of the sensors and/or the selection of the measuring rate.

The scenario in which the vehicle is situated may, for example, be an urban setting, rural surroundings, or an expressway. Depending on the scenario, the various types of sensors in each case make variably important contributions to the quality of the autonomous driving function and/or different measuring rates of the individual sensors may be advantageous, depending on the type of sensor and its attachment location at the vehicle. For the determination of the scenario, for example, the surroundings data of the sensors may be evaluated and/or a digital map may be used.

The weather also has an influence on how strongly a certain kind or a certain type of sensor contributes to the quality of the autonomous driving function. If the vehicle including the autonomous driving function is, for example, traveling while the weather is good, it is possible that data from a video camera situated at the vehicle front are sufficient for achieving the target value for the quality. The provision of the setpoint trajectory by the computer unit may then take place using only the measured data of the video camera, which are then requested at a sufficient measuring rate to achieve the required quality. It is possible in the process that none of the further sensors is selected, and accordingly no measured data of redundant sensors, such as for example radar sensors, are requested by the computer unit. In the case of poor weather conditions, it is conversely possible that, for example, exclusively measured data from a LIDAR sensor are requested, and no measured data of the video camera. The weather may, for example, be ascertained via sensors of the vehicle and/or weather data may be retrieved from a weather service as a function of the location.

Preferably, an individual assessment factor is determined for each individual sensor from the plurality of sensors. Due to these individual assessment factors, it is possible to regard the individual properties of the sensors during the control of the quality. In this way, it is ensured that the respective contribution of a sensor to the quality of the autonomous driving function is assessed during the control, and preferably those sensors which presently make the greatest contributions to the quality are selected.

Preferably, the respective sensors which are not selected are shut off or transferred into a stand-by mode. In the shut-off state or in the stand-by mode, the energy consumption of the respective sensor is reduced, and no surroundings data are ascertained by this sensor.

The adaptation of a measuring rate, which is additionally or alternatively possible in the method, also favorably influences the energy consumption. By selecting the measuring rate in such a way that only surroundings data are ascertained at a measuring rate which is currently required for achieving the required quality, including a tolerance, the amount of surroundings data is reduced compared to the maximally possible amount of surroundings data. In the process, the tolerance for the quality includes a factor which is necessary to safely operate the autonomous vehicle at any time. In this way, fewer surroundings data must be processed by the computer unit, by which, in turn, the capacity utilization, and thus the energy consumption of the computer unit, is favorably influenced.

An adaptation of the measuring rate may take place in both directions, i.e., proceeding from a standard value, the measuring rate may be increased when the quality is too low, and it may be decreased when the quality is above the required target value.

A processing rate of the computer unit for the surroundings data preferably corresponds to the measuring rate and is accordingly adapted in the event of a change in the measuring rate. As an alternative, it is preferred to keep a processing rate of the surroundings data constant, and to carry out a multiple transfer of individual measured values in the event of a reduction in the measuring rate. If the processing rate, for example, is 100 Hz, and if the measuring rate of a sensor has been adapted to 50 Hz, each measured value is consecutively transferred twice to the computer unit for processing. As an alternative, it is also possible, instead of a measured value, to transfer an indication of a missing measured value or of a shut-off of the particular sensor, so that the computer unit does not take this measured value into consideration as an actual measured value during the processing. In particular, during a complete shut-off or when a sensor was switched to stand-by, it is preferred to transfer such a shut-off value.

The determination of the setpoint trajectory preferably takes place using a first artificial intelligence model, which was obtained by machine learning. The first artificial intelligence model is, in particular, designed and configured to provide the autonomous driving function.

The selection of sensors to be used and/or the change of a measuring rate preferably take(s) place using a second artificial intelligence model, which was obtained by machine learning. The second model preferably transfers the surroundings data of the sensors to the first model, the output data of the second artificial intelligence model preferably being transferred in a standardized output data format for the first artificial intelligence model.

Particularly preferably, both the determination of the setpoint trajectory and the selection of sensors to be used and/or the change of a measuring rate preferably take place using a shared artificial intelligence model, which was obtained by machine learning.

The artificial intelligence model or the models may, for example, be a model for machine learning, such as for example a neural deep learning network (DNN), a Bayesian machine learning model, or the like. Such methods and models for machine learning as well as for training these models are generally conventional to those skilled in the art.

The second artificial intelligence model for selecting the sensors to be used and/or the change of the measuring rate, or the shared artificial intelligence model is/are preferably trained with the aid of training data. This takes place, in particular, using a neural network. Preferably, data recorded during a trip are used during the learning using training data. In particular, an ascertained vehicle position and surroundings data of the sensor or sensors using the maximum measuring rate of the particular sensor are used as input data, a target value for the quality of the autonomous driving function being input as the learning target. Furthermore, in particular, information about a scenario in which the vehicle is situated, the traffic density during the recorded trip and/or the weather conditions during the recorded trip may be used as input data.

If surroundings data using a reduced measuring rate are required for training the artificial intelligence model, preferably a down sampling of the surroundings data takes place in a database based on the existing surrounding data which were recorded at the maximum measuring rate of the sensor. This may be implemented in real time by a virtual sensor in a test environment (e.g., hardware in the loop (HIL)).

According to an example embodiment of the present invention, a computer program is furthermore provided, according to which one of the methods described herein is carried out when the computer program is being executed on a programmable computer device. The computer program may, for example, be a module for implementing an autonomous driving function or a sub-system thereof in a vehicle. The computer program may be stored on a machine-readable memory medium, such as on a permanent or rewritable memory medium, or in assignment to a computer device, or on a removable CD-ROM, DVD, Blu-Ray disk or a USB stick. In addition or as an alternative, the computer program may be provided for a download on a computer device such as on a server, e.g., via a data network such as the Internet, or a communication link such as a telephone line or a wireless connection.

According to an example embodiment of the present invention, a vehicle is moreover provided. The vehicle includes a computer unit and at least two sensors for detecting surroundings data, the computer unit being configured to provide an autonomous driving function. The computer unit is furthermore configured to carry out one of the methods described above.

Since the vehicle is designed to carry out one of the methods described herein, features described within the scope of one of the methods apply correspondingly to the vehicle, and features described within the scope of the vehicle apply vice versa to the methods.

The sensors are preferably configured as ultrasonic sensors, optical cameras such as video cameras and infrared cameras, radar sensors, and LIDAR sensors, the vehicle preferably including sensors of various types. In the process, it is possible to use multiple specimens of one type of sensor. For example, the vehicle may include multiple ultrasonic sensors, multiple video cameras, a radar sensor, and a LIDAR sensor.

Preferably, a connection between the sensors and the computer unit is bidirectionally configured so that not only surroundings data of the sensors may be transferred to the computer unit, but, conversely, instructions may be transferred from the computer unit to the sensors. These instructions are, in particular, configured to shut off one or multiple sensor(s), transfer it/them into a stand-by mode, or switch on one or multiple sensor(s). Furthermore, instructions may be designed to change the configuration of one or multiple sensor(s), in particular, to change a measuring rate of one or multiple sensor(s).

The sensors may, for example, be connected to the computer unit via a bus system.

As a result of the selection of sensors and/or adaptation of the measuring rate of at least one sensor provided according to the present invention, the processing load of the computer unit for the provision of the autonomous driving function is dynamically adapted. In this way, the computer unit may be configured to be smaller and less expensive since, based on the present situation, only the surroundings data which are actually required for a safe operation of the autonomous vehicle are evaluated.

According to an example embodiment of the present invention, an objective measure is advantageously provided with the ascertainment of the quality of the autonomous driving function, with the aid of which the precision, and thus the safety, of the autonomous driving function may be assessed at any time.

If it is established, for example, that the quality is below a predefined target value, the performance of the autonomous vehicle in the present situation may be enhanced by selecting further sensors and/or by increasing the measuring rate of sensors. In this way, the safety is enhanced during operation of an autonomous vehicle.

By shutting off sensors which are not selected, or transferring them into a stand-by mode, and reducing the processing load of the computer unit, additionally an energy demand for the provision of the autonomous driving function is decreased. In this way, the range may be increased, in particular, in an electrically driven vehicle.

BRIEF DESCRIPTION OF THE DRAWINGS

Exemplary embodiments of the present invention are described in greater detail based on the figures and the following description.

FIG. 1 schematically shows a vehicle including an autonomous driving function, in accordance with an example embodiment of the present invention.

DETAILED DESCRIPTION OF EXAMPLE EMBODIMENTS

The FIGURE only schematically represents the subject matter of the present invention.

FIG. 1 shows a vehicle 1 which includes a plurality of sensors 10 and a computer unit 30 for the provision of an autonomous driving function. The plurality of sensors 10 is connected to computer unit 30. Computer unit 30 is moreover connected to further systems of vehicle 1 to take over both a longitudinal guidance of vehicle 1, i.e., the acceleration and deceleration, and a lateral guidance of vehicle 1, i.e., the steering. In FIG. 1, this is laid out with the aid of a connection to a steering wheel 7 and to a pedal 8.

Vehicle 1 laid out in FIG. 1 includes various types of sensors 10. In the exemplary embodiment, two ultrasonic sensors 11 and a video camera 12 are situated at the front of vehicle 1. In addition, a LIDAR sensor 13 is situated on the roof of vehicle 1. Of course, more or fewer or also other sensors 10 may be provided.

To ascertain the present position of vehicle 1, a receiver 20 for a satellite navigation system is additionally provided, which is connected to computer unit 30. To support the position determination, preferably further data sources are also resorted to. For example, images of video camera 12 may be evaluated to identify landmarks in the surroundings of vehicle 1, and to determine the vehicle position even more precisely.

For providing an autonomous driving function, during which vehicle 1 is guided from a starting position to a target position without the intervention of a driver, computer unit 30 determines a setpoint trajectory 2. During the determination of setpoint trajectory 2, in particular, surroundings data of sensors 10 and the vehicle position determined, among other things, with the aid of receiver 20 are used.

Vehicle 1 is guided along the determined setpoint trajectory 2, the present vehicle position being relative to setpoint trajectory 2, based on a reference point 6 which is situated in the center of the rear axle of vehicle 1 in the illustrated example. In addition, actual trajectory 4 is plotted in FIG. 1, which indicates which path vehicle 1 has actually driven, based on reference point 6. Actual trajectory 4 is also determined with the aid of the satellite navigation system and/or with the aid of the recognition of landmarks in the surroundings sensor data and/or with the aid of radio signals and/or in a combination thereof.

It is provided, among other things, in the method according to the present invention to compare the actually driven actual trajectory 4 to setpoint trajectory 2, and to determine a quality of the autonomous driving function from the deviation. The lower the deviation, the higher is the quality. Preferably, distances from objects in the surroundings are additionally monitored and incorporated during the determination of the quality.

After the ascertainment of the quality, it is provided, for example, to compare this quality to a predefined target value for the quality, including a permitted tolerance, and to subsequently select which sensors 10 are to be used for the provision of the autonomous driving function. If the quality is higher than the target value, individual sensors 10 may be switched off to save energy, and to reduce the capacity utilization of computer unit 30. If the quality is lower than the target value, further sensors 10 are switched on, and their surroundings data are processed by computer unit 30.

In further specific embodiments of the present invention, it may be provided, additionally or alternatively, to adapt a measuring rate of one or multiple sensor(s) 10, as a function of the quality. In the case of a quality above the target value (including tolerance), the measuring rate may be decreased, and thus the processing load of the computer unit reduced.

The present invention is not limited to the exemplary embodiments described here and the aspects highlighted therein. Rather, a plurality of modifications is possible within the scope of the present invention, which are within the capabilities of those skilled in the art, in view of the disclosure herein.

What is claimed is:

1. A method for operating an autonomous driving function of a vehicle, the vehicle including a computer unit and a plurality of sensors configured to detect surroundings data representing surroundings of the vehicle, and the computer unit being configured to determine a setpoint trajectory, along which the vehicle is guided, based on the detected surroundings data, the method comprising the following steps:
   a) detecting an actual trajectory of the vehicle, the actual trajectory representing a path actually covered by the vehicle;
   b) comparing the detected actual trajectory to the setpoint trajectory;

c) detecting distances of the vehicle from objects in the surroundings of the vehicle;
d) ascertaining an actual quality of the autonomous driving function based on (i) a result of the comparison of the detected actual trajectory to the setpoint trajectory and (ii) the detected distances; and
e) based on a difference between the ascertained actual quality and a predefined target quality, performing a modification that includes at least one of (i) turning on or off one of more of the plurality of sensors for a continued operation of the autonomous driving function and (ii) for each of one or more of the plurality of sensors, changing a measuring rate at which measurements are carried out by the respective sensor, the modification being performed in a manner that is determined to reduce the difference.

2. The method as recited in claim 1, wherein, taking at least one further parameter into consideration, at least one assessment factor is determined and taken into consideration during the selection of the sensors to be used and/or during the change of the measuring rate, the at least one further parameter being selected from: (i) a capacity utilization of the computer unit, and/or (ii) a traffic situation in which the vehicle is situated, (iii) a scenario in which the vehicle is situated, and/or (iv) information about weather at the location of the vehicle.

3. The method as recited in claim 2, wherein the assessment factor is individually determined for each individual sensor of the plurality of sensors.

4. The method as recited in claim 1, wherein sensors which are not selected are switched off or transferred into a stand-by mode.

5. The method as recited in claim 1, wherein the determination of the setpoint trajectory takes place using a first artificial intelligence model, which was obtained by machine learning.

6. The method as recited in claim 1, wherein the selection of sensors to be used and/or the change of a measuring rate takes place using a second artificial intelligence model, which was obtained by machine learning.

7. The method as recited in claim 1, wherein: (i) the determination of the setpoint trajectory, and (ii) the selection of sensors to be used and/or the change of a measuring rate, take place using a shared artificial intelligence model, which was obtained by machine learning.

8. The method as recited in claim 1, wherein a capacity utilization of the computer unit is taken into consideration for determining how to perform the modification.

9. The method as recited in claim 1, wherein the modification includes turning off the one or more of the plurality of sensors in response to the ascertained actual quality being greater than the predefined target quality or a tolerance range of the target quality, to thereby reduce the actual quality.

10. The method as recited in claim 1, wherein the modification includes turning on the one or more of the plurality of sensors in response to the ascertained actual quality being less than the predefined target quality or a tolerance range of the target quality, to thereby increase the actual quality.

11. The method as recited in claim 1, wherein:
the modification includes the changing of the measuring rate; and
the changing of the measuring rate is performed by lowering the measuring rate in response to the ascertained actual quality being greater than the predefined target quality or a tolerance range of the target quality, to thereby reduce the actual quality.

12. The method as recited in claim 1, wherein:
the modification includes the changing of the measuring rate; and
the changing of the measuring rate is performed by increasing the measuring rate in response to the ascertained actual quality being lower than the predefined target quality or a tolerance range of the target quality, to thereby increase the actual quality.

13. A method for operating an autonomous driving function of a vehicle, the vehicle including a plurality of sensors configured to detect surroundings data and a computer unit configured to determine a setpoint trajectory along which the vehicle is guided based on the detected surroundings data, the method comprising the following steps:
a) detecting an actual trajectory of the vehicle, the actual trajectory representing a path actually covered by the vehicle;
b) detecting distances from objects based on the surroundings data;
b) ascertaining a quality of the autonomous driving function by comparing the actual trajectory to the setpoint trajectory and the detected distances; and
c) controlling the quality to a predefined target value by changing a measuring rate at which measurements are carried out by at least one sensor of the plurality of sensors, wherein:
(i) a processing rate of the computer unit for processing the surroundings data is adapted to the measuring rate; or
(ii) a processing rate of the surroundings data is constant, the changing of the measuring rate includes reducing the measuring rate, and a multiple transfer of individual measured values is carried out in response to the reduction of the measuring rate.

14. The method as recited in claim 13, wherein the processing rate of the computer is adapted to the measuring rate.

15. The method as recited in claim 13, wherein the processing rate of the surroundings data is constant, the changing of the measuring rate includes the reduction of the measuring rate, and the multiple transfer of individual measured values is carried out in response to the reduction of the measuring rate.

16. A non-transitory computer-readable medium on which is stored a computer program for operating an autonomous driving function of a vehicle, the vehicle including a computer unit and a plurality of sensors configured to detect surroundings data representing surroundings of the vehicle, and the computer unit being configured to determine a setpoint trajectory, along which the vehicle is guided, based on the detected surroundings data, the computer program, when executed by a computer, causing the computer to perform the following steps:
a) detecting an actual trajectory of the vehicle, the actual trajectory representing a path actually covered by the vehicle;
b) comparing the detected actual trajectory to the setpoint trajectory;
c) detecting distances of the vehicle from objects in the surroundings of the vehicle;
d) ascertaining an actual quality of the autonomous driving function based on (i) a result of the comparison of the detected actual trajectory to the setpoint trajectory and (ii) the detected distances; and
e) based on a difference between controlling the ascertained actual quality and a predefined target quality, performing a modification that includes at least one of (i) turning on or off one of more of the plurality of sensors for a continued operation of the autonomous driving function and (ii) for each of one or more of the plurality of sensors, changing a measuring rate at which measurements are carried out by the respective sensor, the modification being performed in a manner that is determined to reduce the difference.

17. A vehicle, comprising:

a computer unit; and a plurality of sensors configured to detect surroundings data representing surroundings of the vehicle;

wherein the computer unit is configured to provide an autonomous driving function of the vehicle, the computer unit being configured to determine a setpoint trajectory, along which the vehicle is guided, based on the detected surroundings data, the computer unit being configured to:

a) detect an actual trajectory of the vehicle, the actual trajectory representing a path actually covered by the vehicle;

b) compare the detected actual trajectory to the setpoint trajectory;

c) detect distances of the vehicle from objects in the surroundings of the vehicle;

d) ascertain an actual quality of the autonomous driving function based on (i) a result of the comparison of the detected actual trajectory to the setpoint trajectory and (ii) the detected distances; and e) based on a difference between the ascertained actual quality and a predefined target quality, perform a modification that includes at least one of (i) turning on or off one of more of the plurality of sensors for a continued operation of the autonomous driving function and (ii) for each of one or more of the plurality of sensors, changing a measuring rate at which measurements are carried out by the respective sensor, the modification being performed in a manner that is determined to reduce the difference.

* * * * *